United States Patent
Cho et al.

(10) Patent No.: US 11,483,897 B2
(45) Date of Patent: Oct. 25, 2022

(54) METHOD AND APPARATUS FOR PROVIDING SESSION-BASED WEB SERVICE

(71) Applicant: Samsung Electronics Co., Ltd., Suwon-si (KR)

(72) Inventors: Songyean Cho, Seoul (KR); Sangsoo Jeong, Suwon-si (KR); Hyejeong Kim, Suwon-si (KR); Yunsang Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 566 days.

(21) Appl. No.: 15/528,758

(22) PCT Filed: Nov. 23, 2015

(86) PCT No.: PCT/KR2015/012598
§ 371 (c)(1),
(2) Date: May 22, 2017

(87) PCT Pub. No.: WO2016/080816
PCT Pub. Date: May 26, 2016

(65) Prior Publication Data
US 2017/0347390 A1     Nov. 30, 2017

(30) Foreign Application Priority Data
Nov. 21, 2014   (KR) .................. 10-2014-0163427

(51) Int. Cl.
*H04W 80/10*     (2009.01)
*H04W 80/12*     (2009.01)
(Continued)

(52) U.S. Cl.
CPC ........... *H04W 80/10* (2013.01); *H04L 67/141* (2013.01); *H04L 67/142* (2013.01);
(Continued)

(58) Field of Classification Search
CPC ....... H04W 80/10; H04W 4/12; H04W 80/12; H04L 67/141; H04L 67/142; H04L 67/146

See application file for complete search history.

(56) References Cited

U.S. PATENT DOCUMENTS

| | | | |
|---|---|---|---|
| 2003/0105981 A1* | 6/2003 | Miller | G06F 21/41 726/8 |
| 2013/0086656 A1* | 4/2013 | Paddon | G01S 19/246 726/6 |

(Continued)

FOREIGN PATENT DOCUMENTS

| | | |
|---|---|---|
| EP | 3024210 A1 | 5/2016 |
| KR | 20130065878 A | 6/2013 |

(Continued)

OTHER PUBLICATIONS

Extended European Search Report for European Application No. 15860232.6, dated Oct. 25, 2017. (11 pages).

(Continued)

*Primary Examiner* — Lance Leonard Barry
*Assistant Examiner* — Timothy Sowa

(57) ABSTRACT

The present disclosure relates to a communication technique and system for combining 5G communication systems with IoT technologies to achieve a higher data rate beyond 4G systems. The present disclosure can be applied to intelligent services (e.g., smart homes, smart buildings, smart cities, smart or connected cars, healthcare, digital education, retail businesses, and security and safety related services) on the basis of 5G communication technologies and IoT related technologies. As an embodiment of the present specification, there is provided a method of signal transmission and reception for a user equipment (UE) in a mobile communication system. The method may include: receiving first information for providing a service from a service providing server; receiving second information for managing a session associated with the service from the service providing server; and sending a signal to the service providing server on the basis of the first information and the second information. In one embodiment of the present specification, when a sponsored service and a WebRTC service are provided, service provision information and session management information are associated together. Thereby, it is possible to improve user convenience and service effectiveness.

13 Claims, 11 Drawing Sheets

(51) Int. Cl.
*H04L 67/141* (2022.01)
*H04L 67/142* (2022.01)
*H04L 67/146* (2022.01)
*H04W 4/12* (2009.01)

(52) U.S. Cl.
CPC ............ *H04L 67/146* (2013.01); *H04W 4/12* (2013.01); *H04W 80/12* (2013.01)

(56) References Cited

U.S. PATENT DOCUMENTS

| | | | | |
|---|---|---|---|---|
| 2014/0282881 | A1* | 9/2014 | Li | H04L 63/10 726/4 |
| 2014/0282983 | A1* | 9/2014 | Ju | H04W 12/06 726/8 |
| 2014/0308918 | A1* | 10/2014 | Lee | H04L 63/0807 455/406 |
| 2014/0348029 | A1* | 11/2014 | Lee | H04L 12/1453 370/259 |
| 2015/0067807 | A1* | 3/2015 | Williams | H04L 63/083 726/7 |
| 2016/0105881 | A1* | 4/2016 | Kim | H04L 61/2007 455/450 |

FOREIGN PATENT DOCUMENTS

| | | |
|---|---|---|
| KR | 20130065879 A | 6/2013 |
| KR | 20130103926 A | 9/2013 |
| KR | 20140011031 A | 1/2014 |
| KR | 20140131838 A | 11/2014 |
| KR | 20160042692 A | 4/2016 |

OTHER PUBLICATIONS

Foreign Communication From a Related Counterpart Application, PCT Application No. PCT/KR2015/012598, International Search Report dated Mar. 11, 2016, 3 pages.

Foreign Communication From a Related Counterpart Application, PCT Application No. PCT/KR2015/012598, Written Opinion dated Mar. 11, 2016, 6 pages.

* cited by examiner

METHOD AND APPARATUS FOR PROVIDING SESSION-BASED WEB SERVICE

CROSS-REFERENCE TO RELATED APPLICATION(S)

The present application claims priority under 35 U.S.C. § 365 to International Patent Application No. PCT/KR2015/012598 filed Nov. 23, 2015, entitled "METHOD AND APPARATUS FOR PROVIDING SESSION-BASED WEB SERVICE", and, through International Patent Application No. PCT/KR2015/012598, to Korean Patent Application No. 10-2014-0163427 filed Nov. 21, 2014, each of which are incorporated herein by reference into the present disclosure as if fully set forth herein.

TECHNICAL FIELD

Embodiments of the present specification relate to a method and apparatus for providing session-based web services and, more particularly, to a service control method and apparatus that can provide information on a web session configured between a user equipment and a server and information on the right to a specific service in an associated manner.

BACKGROUND ART

To cope with the increasing demand for wireless data traffic after commercialization of 4G communication systems, active efforts are underway to develop enhanced 5G or pre-5G communication systems. As such, 5G or pre-5G communication systems are referred to as beyond 4G communication systems or post LTE systems. To achieve high data rates, use of the extremely high frequency (mmWave) band (e.g. 60 GHz band) is expected in a 5G communication system. To reduce propagation pathloss and to increase propagation distance at the mmWave band, use of various technologies such as beamforming, massive MIMO, full dimensional MIMO (FD-MIMO), array antenna, analog beamforming and large scale antenna are under discussion for 5G communication systems. To enhance system networks, various technologies such as evolved or advanced small cell, cloud radio access network (cloud RAN), ultra-dense network, device-to-device (D2D) communication, wireless backhaul, moving network, cooperative communication, Coordinated Multi-Points (CoMP) and interference cancellation are under development for 5G communication systems. In addition, for 5G communication systems, hybrid FSK and QAM modulation (FQAM) and sliding window superposition coding (SWSC) are under development for advanced coding modulation (ACM), and filter bank multi carrier (FBMC), non-orthogonal multiple access (NOMA) and sparse code multiple access (SCMA) are under development for advanced access.

Meanwhile, the Internet is evolving from a human centered network where humans create and consume information into the Internet of Things (IoT) where distributed elements or things process and exchange information. Big data processing through cloud servers and IoT technology are being combined into the Internet of Everything (IoE). To realize IoT services, base technologies such as sensing, wired/wireless communication and network infrastructure, service interfacing and security are needed, and technologies interconnecting things such as sensor networks, Machine-to-Machine (M2M) or Machine Type Communication (MTC) are under development. In IoT environments, it is possible to provide intelligent Internet technology services, which collect and analyze data created by interconnected things to add new values to human life. Through convergence and combination between existing information technologies and various field technologies, IoT technology may be applied to various areas such as smart homes, smart buildings, smart cities, smart or connected cars, smart grids, health-care, smart consumer electronics, and advanced medical services.

Accordingly, various attempts are being made to apply 5G communication systems to IoT networks. For example, sensor networks and machine-to-machine or machine type communication are being realized by use of 5G communication technologies including beamforming, MIMO and array antennas. Application of cloud RANs to big data processing described above may be an instance of convergence of 5G communication technology and IoT technology.

Typical mobile communication systems have been developed to provide voice services while guaranteeing user mobility. Such mobile communication systems have gradually expanded their coverage from voice services through data services up to high-speed data services. However, as current mobile communication systems suffer resource shortages and users demand even higher-speed services, development of more advanced mobile communication systems is needed.

To meet this demand, the 3rd Generation Partnership Project (3GPP) has been working to standardize specifications for the Long Term Evolution (LTE) system as a next generation mobile communication system. The LTE system aims to realize high-speed packet based communication supporting a data rate of about 100 Mbps. To this end, various approaches have been considered, such as reducing the number of nodes on a communication path through simplification of the network architecture and bringing wireless protocols as close as possible to wireless channels.

In particular, communication systems including mobile communication systems are used to provide web-based services. Recently, many people are paying attention to the WebRTC (Web Real-Time Communication) technology enabling web-based real-time communication services, and sponsored services where the service provider bears communication costs of users.

DISCLOSURE OF INVENTION

Technical Problem

Embodiments of the present specification have been made in view of the above issues. Accordingly, an aspect of the present specification is to provide a method and apparatus that can deliver a service to the user by combining service-control information and session information together in one of a WebRTC service and a sponsored service. Another aspect of the present specification is to provide a method and apparatus that can deliver a service to the user by combining token information for service control and cookie information associated with the session between the user and server.

Solution to Problem

In accordance with an aspect of the present specification, there is provided a method of signal transmission and reception for a user equipment (UE) in a mobile communication system. The method may include: receiving first information for providing a service from a service providing server; receiving second information for managing a session associated with the service from the service providing server; and sending a signal to the service providing server on the basis of the first information and the second information.

In accordance with another aspect of the present specification, there is provided a method of signal transmission and reception for a service providing server in a mobile communication system. The method may include: sending first information for providing a service to a user equipment (UE); sending second information for managing a session associated with the service to the UE; and receiving a signal from the UE on the basis of the first information and the second information.

In accordance with another aspect of the present specification, there is provided a user equipment capable of signal transmission and reception in a mobile communication system. The user equipment may include: a transceiver unit to send and receive signals to and from a service providing server or a core network; and a controller to perform a process of controlling the transceiver unit, receiving first information for providing a service from the service providing server, receiving second information for managing a session associated with the service from the service providing server, and sending a signal to the service providing server on the basis of the first information and the second information.

In accordance with another aspect of the present specification, there is provided a service providing server capable of signal transmission and reception in a mobile communication system. The service providing server may include: a transceiver unit to send and receive a signal to and from a user equipment (UE); and a controller to perform a process of controlling the transceiver unit, sending first information for providing a service to the UE, sending second information for managing a session associated with the service to the UE, and receiving a signal from the UE on the basis of the first information and the second information.

Advantageous Effects of Invention

In a feature of the present specification, when a sponsored service and a WebRTC service are provided, service provision information and session management information are combined and associated together. Hence, it is possible to improve user convenience and service effectiveness.

MODE FOR THE INVENTION

Figure 1:
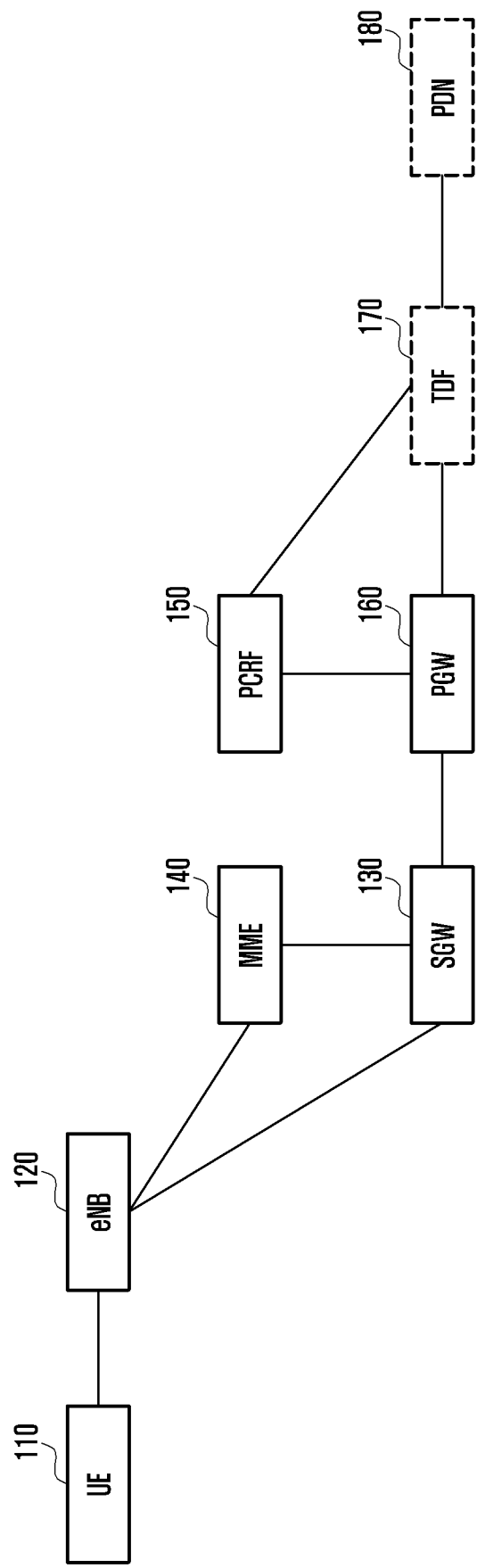
FIG. 1 shows an overview of a communication system according to an embodiment of the present specification.

Hereinafter, embodiments of the present invention are described in detail with reference to the accompanying drawings.

Descriptions of functions and structures well known in the art and not directly related to the present invention may be omitted for clarity and conciseness, avoiding obscuring the subject matter of the present invention.

In the drawings, some elements are exaggerated, omitted, or only outlined in brief, and thus may be not drawn to scale. The same or similar reference symbols are used throughout the drawings to refer to the same or like parts.

The aspects, features and advantages of certain embodiments of the present invention will be more apparent from the following detailed description taken in conjunction with the accompanying drawings. The description of the various embodiments is to be construed as exemplary only and does not describe every possible instance of the present invention. It should be apparent to those skilled in the art that the following description of various embodiments of the present invention is provided for illustration purpose only and not for the purpose of limiting the present invention as defined by the appended claims and their equivalents. The same reference symbols are used throughout the description to refer to the same parts.

Meanwhile, it is known to those skilled in the art that blocks of a flowchart (or sequence diagram) and a combination of flowcharts may be represented and executed by computer program instructions. These computer program instructions may be loaded on a processor of a general purpose computer, special purpose computer or programmable data processing equipment. When the loaded program instructions are executed by the processor, they create a means for carrying out functions described in the flowchart. As the computer program instructions may be stored in a computer readable memory that is usable in a specialized computer or a programmable data processing equipment, it is also possible to create articles of manufacture that carry out functions described in the flowchart. As the computer program instructions may be loaded on a computer or a programmable data processing equipment, when executed as processes, they may carry out steps of functions described in the flowchart.

A block of a flowchart may correspond to a module, a segment or a code containing one or more executable instructions implementing one or more logical functions, or to a part thereof. In some cases, functions described by blocks may be executed in an order different from the listed order. For example, two blocks listed in sequence may be executed at the same time or executed in reverse order.

In the description, the word "unit", "module" or the like may refer to a software component or hardware component such as an FPGA or ASIC capable of carrying out a function or an operation. However, "unit" or the like is not limited to hardware or software. A unit or the like may be configured so as to reside in an addressable storage medium or to drive one or more processors. Units or the like may refer to software components, object-oriented software components, class components, task components, processes, functions, attributes, procedures, subroutines, program code segments, drivers, firmware, microcode, circuits, data, databases, data structures, tables, arrays or variables. A function provided by a component and unit may be a combination of smaller components and units, and may be combined with others to compose large components and units. Components and units may be configured to drive a device or one or more processors in a secure multimedia card.

The following description of embodiments is focused on 3GPP LTE systems. However, it should be understood by those skilled in the art that the subject matter of the present invention is applicable to other communication systems having similar technical backgrounds and channel configurations without significant modifications departing from the scope of the present invention. In addition, the control method and apparatus for providing a sponsored service or WebRTC service described as an embodiment of the present specification may be applied to different services where session information and service control information are managed in an associated manner.

FIG. 1 shows an overview of a communication system according to an embodiment of the present specification.

Referring to FIG. 1, a user equipment (UE) 110 may send and receive a signal to and from the communication system according to an embodiment of the present specification. The communication system may include at least one of a base station (evolved NodeB, eNB) 120, Serving Gateway (SGW) 130, Mobility Management Entity (MME) 140, Policy and Charging Rules Function (PCRF) 150, Packet Data Network Gateway (PGW) 160, Traffic Detection Function (TDF) 170, and Packet Data Network (PDN) 180.

As shown in FIG. 1, the radio access network of the LTE mobile communication system may include the eNB 120, MME 140, and SGW 130.

The UE 110 may connect to an external network through the eNB 120, SGW 130, and PGW 160. A PDN connection is to be established to enable the UE 110 to send and receive data through the PGW 160. One PDN connection may include one or more EPS bearers.

The eNB 120 is a radio access network (RAN) node, which corresponds to Radio Network Controller (RNC) of the UTRAN system or Base Station Controller (BSC) of the GERAN system. The eNB 120 may be connected with the UE 110 through a wireless channel and may function similarly to the existing RNC or BSC. In the LTE system, as all user traffic including real-time services like VoIP (Voice over IP) services is served by shared channels, it is necessary to perform scheduling on the basis of status information collected from UEs 110. The eNB 120 may perform this scheduling function.

The SGW 130 provides data bearers, and may create and remove a data bearer under the control of the MME 140.

The MME 140 performs various control functions, and may be connected to multiple eNBs.

The PCRF 150 is an entity performing overall QoS and charging control functions for traffic. In one embodiment, the PCRF 150 may control policies related to user QoS (Quality of Service). Policy and charging control (PCC) rules corresponding to a specific policy may be sent to the PGW 160 for enforcement.

The PGW 160 interconnects the operator network and an external PDN. In one embodiment, the PGW 160 may enforce QoS/traffic policies and charging policies through the PCRF 150.

The TDF 170 detects traffic, and may perform inspection on packets and report the inspection result to another network entity (e.g. PCRF). According to embodiments, the TDF 170 may be configured as a separate network node including a server or as a function of the PGW 160.

The PDN 180 is a network capable of sending and receiving packet data. A representative example of a PDN is the Internet.

Figure 2:
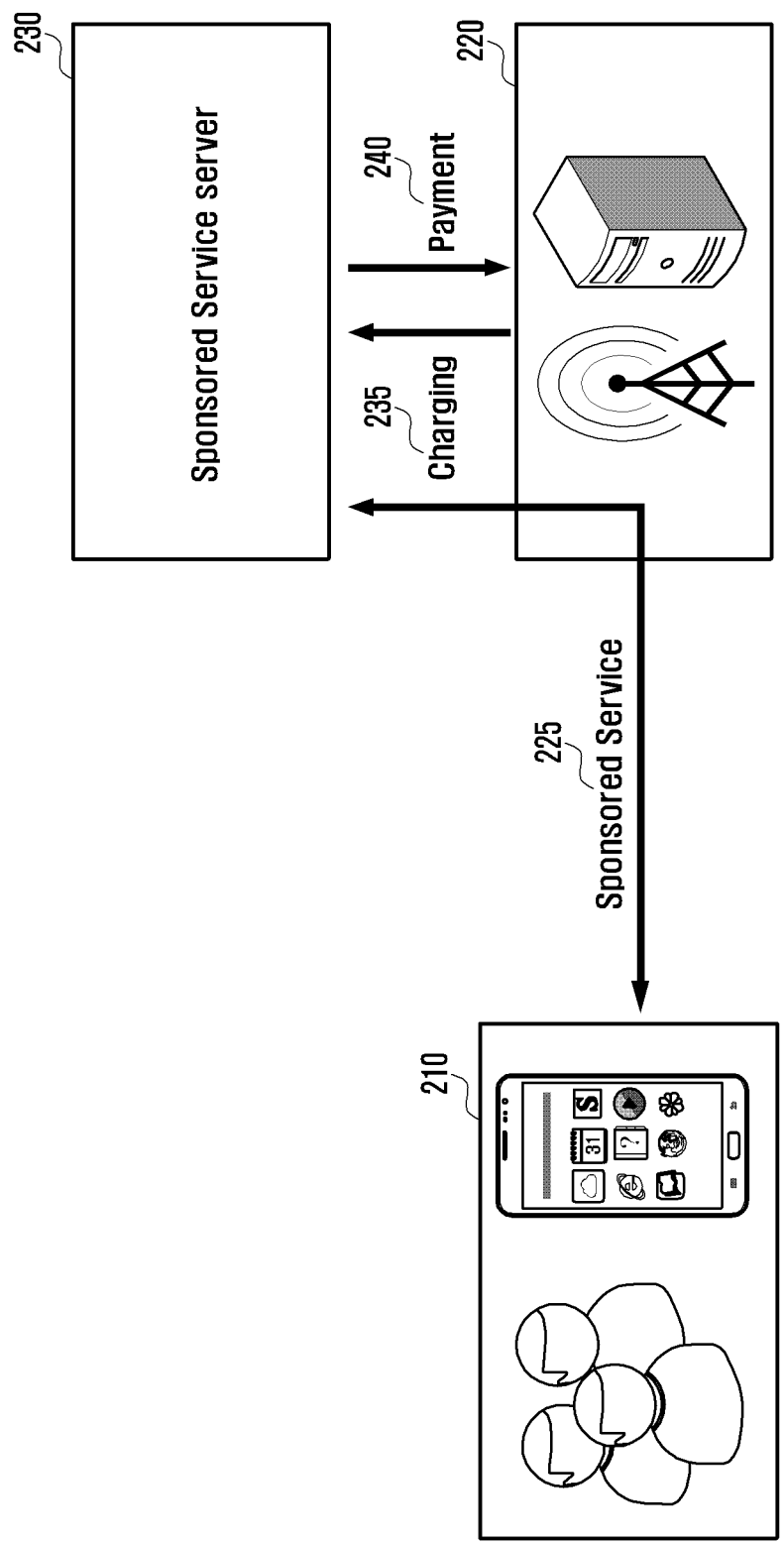
FIG. 2 illustrates a scheme for providing a sponsored service according to an embodiment of the present specification.

FIG. 2 illustrates a scheme for providing a sponsored service according to an embodiment of the present specification.

Referring to FIG. 2, signals may be exchanged between a UE 210, a communication network 220, and a sponsored service server 230 so as to provide a sponsored service to the UE 210.

More specifically, the sponsored service may be delivered through a specific application pre-loaded or downloaded on the UE 210. The sponsored service may be provided according to a preset agreement between the terminal manufacturer, the network operator, and the sponsored service provider. When the UE 210 receives a sponsored service (225), the operator of the communication network 220 may charge the operator of the sponsored service server 230 for the sponsored service (235), and the operator of the sponsored service server 230 may make a payment to the operator of the communication network 220 for the communication charge related to the sponsored service used by the UE 210 (240). According to embodiments, the agent managing the sponsored service may be identical to or different from the agent managing the sponsored service server 230.

In some cases, when the UE 210 presents the communication network 220 with sponsored service information received from the sponsored service server 230, the communication network 220 may not make a charge for the traffic related to the sponsored service delivered to the UE 210. To deliver the sponsored service, the operator of the sponsored service server 230 may distribute applications for the sponsored service to UEs and provide information on the sponsored service to the communication network 220 for authentication.

Next, a description is given of a scheme for providing session-based web services. In embodiments of the present specification, a session-based service may be based on an agreement between the communication network operator and a third party (or, service provider). For example, the session-based service may be aimed at a sponsored data service or sponsored charging service where, under a sponsor agreement between the operator and a third party, a third party service is provided through the operator network while the third party pays for the costs associated with the traffic caused by the third party service on behalf of the user. In one embodiment, the server may be a server operated by the third party to provide information regarding a service offered by the service provider. In one embodiment, the third party server may be a server providing a WebRTC service.

For example, when a shopping mall service provider introduces a sponsored data service for online shopping under an agreement with the communication network operator, users may use online shopping through the service provided by the shopping mall service provider without separately paying for communication costs. The shopping mall service provider may expect an increase in shopping mall sales or an indirect increase in sales through advertisement owing to an increase in the number of customers.

In one embodiment, the sponsored data service may be combined with subscription to a specific communication service. For example, a network operator providing communication services and a service provider (third party) providing actual application services may enter into a contract where the third party agrees to pay communication costs incurred by users using the application services. Here, the network operator may offer a free-of-charge service plan to users having a subscription to a third party service (subscription-based service plan). Thereafter, a user may receive token information from a server managing third party services, send the token information to the network, and use a third party service. Here, the corresponding communication charge can be handled according to the contract between the network operator and the third party.

In embodiments of the present invention, the target service may be a Web Real-Time Communication (WebRTC) service, and the server may be a web server providing a WebRTC service or WebRTC Web Server Function (WWSF).

In this case, the user may receive a real-time service on the basis of the web. While such a web-based real-time service is being provided, the session may be maintained between the user equipment and the web server or the peer of the real-time service.

In general, web services may be provided by use of the Hypertext Transfer Protocol (HTTP). HTTP was originally designed as a stateless protocol (no need to store the state in the terminal or the server or to drive a state machine). In this case, whenever a client is connected, the server may have to retrieve client information from the database or find a stored context corresponding to the client. As this increases the processing load of the server, it is necessary to use a scheme for providing a session-based service. In particular, login-based web services (electronic mail or social networking services), real-time communication services (voice/video calls), and session-based services (Internet gaming) require a scheme to maintain the session in HTTP-based communication.

Meanwhile, in the case of a sponsored service provisioned by joint efforts of a third party and the network operator, to provide a communication service through the operator network to a user authenticated by the third party, the user equipment may send information indicating a communication service request related to the service or authentication information to the operator network. Here, the service may be a sponsored service or WebRTC service described before. Thereafter, the right given by the third party service provider to the user for the service or authentication information may be sent as a token to the user equipment. According to embodiments, the token containing authentication information may be generated by a server identical to or different from the server providing web services. In the event that the token is generated by a different server, when the token information expires, the web service server may send a message requesting token reissuance to the token generation server. The token generation server may generate a token corresponding to the message and send the token to the user equipment.

In one embodiment, the user equipment may receive a token from the third party server and send information contained in the token to the operator network for service reception. Upon reception of the token information, the operator network may check validity of the user request and provide a requested service to the user equipment on the basis of the token information.

Figure 3:
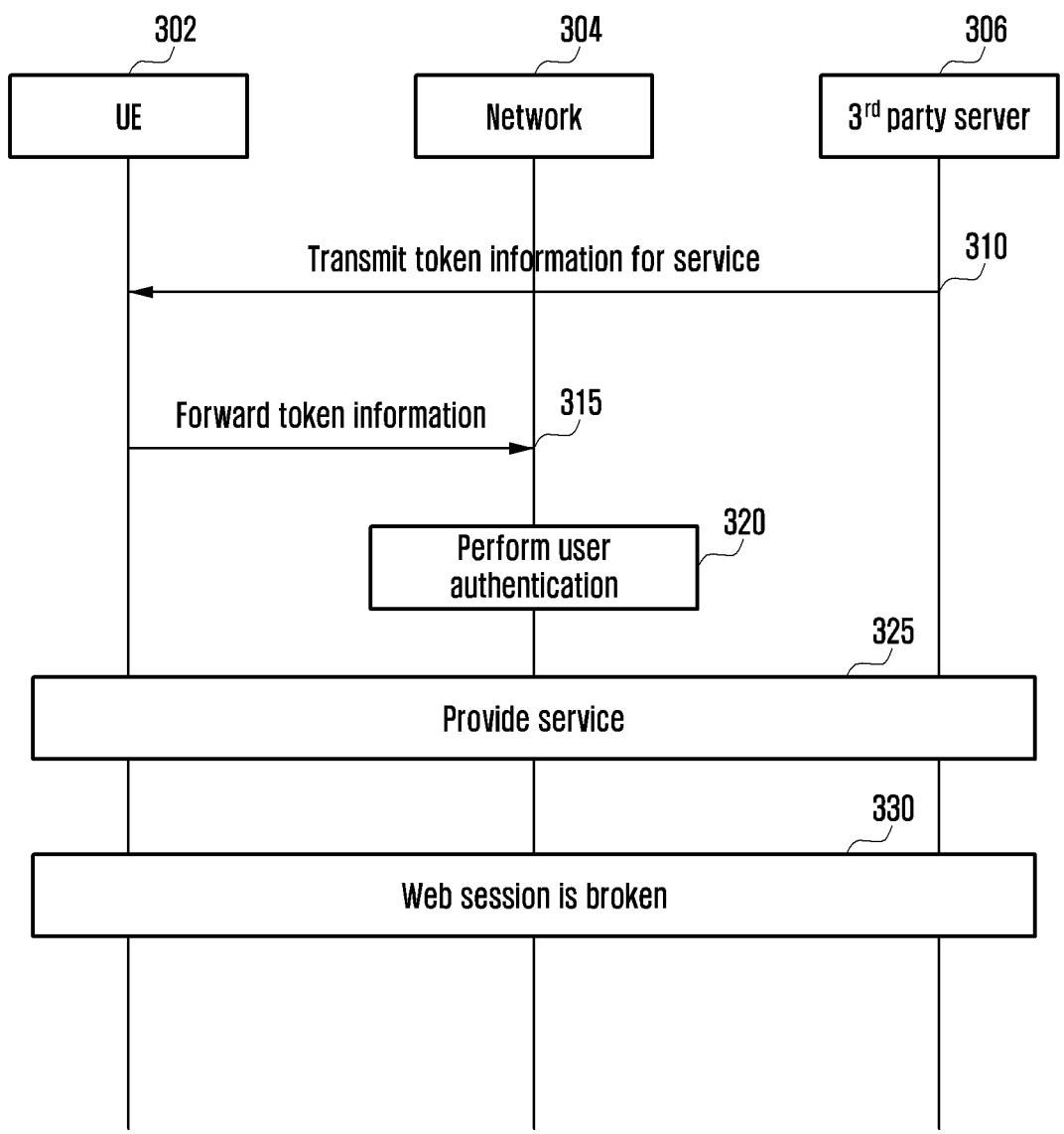
FIG. 3 illustrates a scheme for providing a service according to an embodiment of the present specification.

FIG. 3 illustrates a scheme for providing a service according to an embodiment of the present specification.

Referring to FIG. 3, the UE 302, the network 304, and the third party server 306 may exchange signals. The network 304 may include at least one of the entities described in connection with FIG. 1.

At step 310, the third party server 306 may send token information for the service to the UE 302. The token information may include information regarding at least one of the identity identifying the token, the expiration time of the token, the amount of available traffic associated with the token, and QoS for the service.

At step 315, the UE 302 may send a message containing the token information for network access to the network 304.

At step 320, the network 304 may perform user authentication on the basis of the received information. Specifically, the token received from the UE 302 may include authentication information on the UE authenticated by the third party and information on the service available to the UE and associated QoS. The network may use the information contained in the token to check validity of the service request from the UE, and provide a requested service with suitable QoS if the service request is valid.

Thereafter, at step 325, the UE 302 may receive a service from the third party server 306 via the network 304. To receive a service from the third party server 306, the UE 302 may log in to the third party server 306 and maintain the session with the third party server 306.

At step 330, the web session may be broken while the service is being provided. When the web session is broken while the service is being provided, it is necessary to reestablish a session for a separate service although the token information is valid.

In a service model like a sponsored service or WebRTC service, when a token is issued and used for the service, it is preferable to maintain the web session between the UE 302 and the third party server 306 while the token is valid. When the web session is broken while the service using the token is ongoing, it is necessary to reestablish the session between the UE 302 and the third party server 306. However, session reestablishment may involve requesting the user to log in and interrupt the real-time service, causing user inconvenience. Session reestablishment may also increase the processing load of the third party server 306. Hence, to provide a web service based on a token, it is necessary to manage the token information and the session information in combination. In the above description, the third party server 306 may be at least one of a server providing a sponsored service and a server providing a WebRTC service.

The first embodiment of the present specification relates to a scheme for maintaining a session in a web-based service.

This embodiment may include a scheme for combining the token for a web service and the information for maintaining the session (referred to as a cookie) together.

Figure 4:
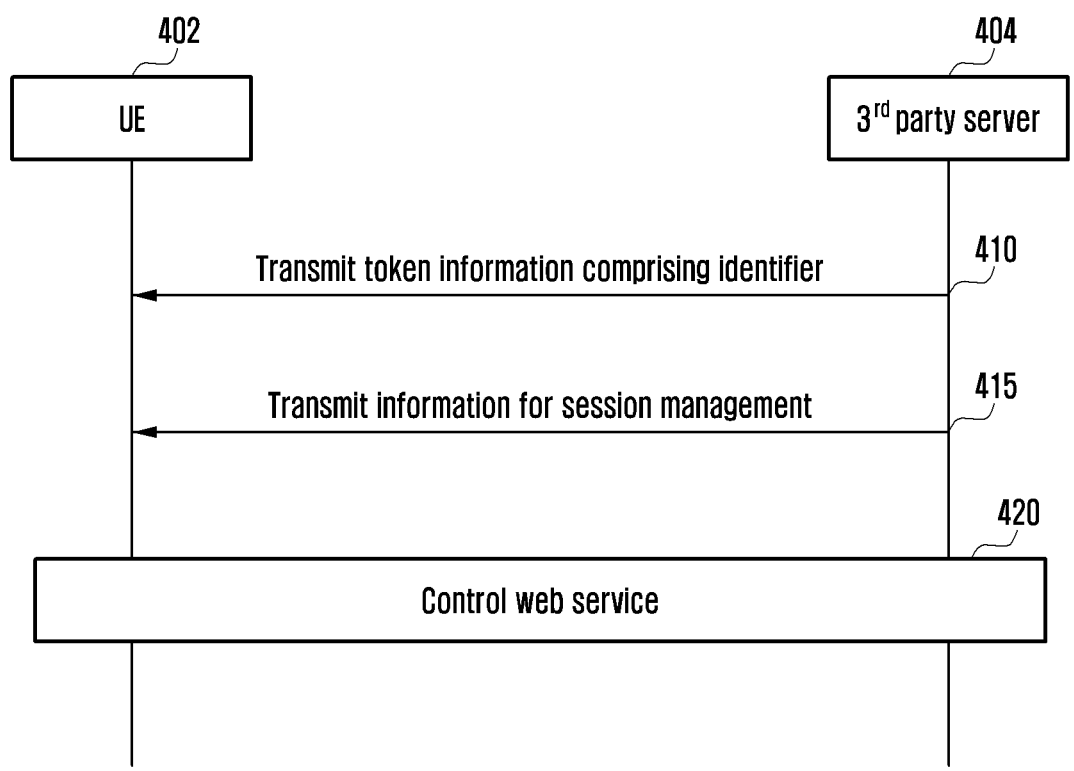
FIG. 4 illustrates a scheme for delivering control information and controlling a service correspondingly according to an embodiment of the present specification.

FIG. 4 illustrates a scheme for delivering control information and controlling a service correspondingly according to an embodiment of the present specification.

Referring to FIG. 4, the UE 402 and the third party server 404 may exchange signals. A network entity may be disposed between the two entities according to embodiments.

At step 410, the third party server 404 may send token information containing an identifier to the UE 402. When the third party server 404 issues a token for the UE 402, it may create information to identify the token. The identifier may be information for identifying the token, and may be referred to as a token identifier. In one embodiment, the token identifier may be generated on the basis of a random number, a user identifier, a time value, or a combination thereof.

At step 415, the third party server 404 may send information for session management to the UE 402. In one embodiment, the information sent at step 410 and at step 415 may be sent by a single message at one step. The information for session management may include information needed to install a cookie in the browser (or web service software) of the UE 402. The UE 402 may create a cookie on the basis of the information for session management, and may send and receive web service data to and from the third party server 404 on the basis of the cookie. The web service data may be sent and received through the network. In one embodiment, the information sent at step 410 and at step 415 may be sent by a single message. The information for session management may include information identifying the service offered by the third party server 404, which may correspond to the information contained in the token information. Accordingly, the UE 402 may receive token information for the service offered by the third party server 404 and information for session management and control transmission and reception of information related to the service offered by the third party server 404 correspondingly.

The cookie created or stored in the UE 402 on the basis of the information received at step 415 may include at least one of information identifying the session, a value to determine the valid time of the session, a domain name serving as the destination of the session, and information identifying the token for the service offered in combination with the web session. The information contained in the cookie may be included in an HTTP message sent by the third party server 404 to the UE 402. As described above, upon reception of such an HTTP message, the UE 402 may set a cookie on the basis of the information contained in the received HTTP message.

More specifically, the cookie created and stored in the UE 402 on the basis of information received from the third party server 404 may include at least one of the following information elements.

| Name = value (e.g., SSID) | Expires (Max-age) | Domain name | Token ID |
|---|---|---|---|

Here, "Name" indicates information identifying the cookie, for example a service set identifier (SSID).

"Expires" indicates the duration for which the cookie is valid and may be given by, for example, "max age" (a time value, a date value, or a combination thereof). In one embodiment, the UE 402 may extend the expiration time through communication with the third party server 404 before expiration of the valid time.

"Domain name" indicates information related to the name of the domain from which the UE 402 receives a service.

"Token ID" indicates information related to the identifier of the token used by the UE 402 to receive a service.

The sequence of information elements contained in the cookie may change, and the cookie may further include session-related information.

In one embodiment, the third party server 404 may also store information regarding the cookie stored in the UE 402 and control the web service session on the basis of the stored information.

In one embodiment, when the UE 402 establishes a connection to the third party server 404, it may send a message containing cookie information, which may be used later to control a service associated with sent and received data.

The second embodiment of the present specification for managing session information and cookie information may include a scheme for controlling a web-session based realtime service using the above setting information.

Figure 5:
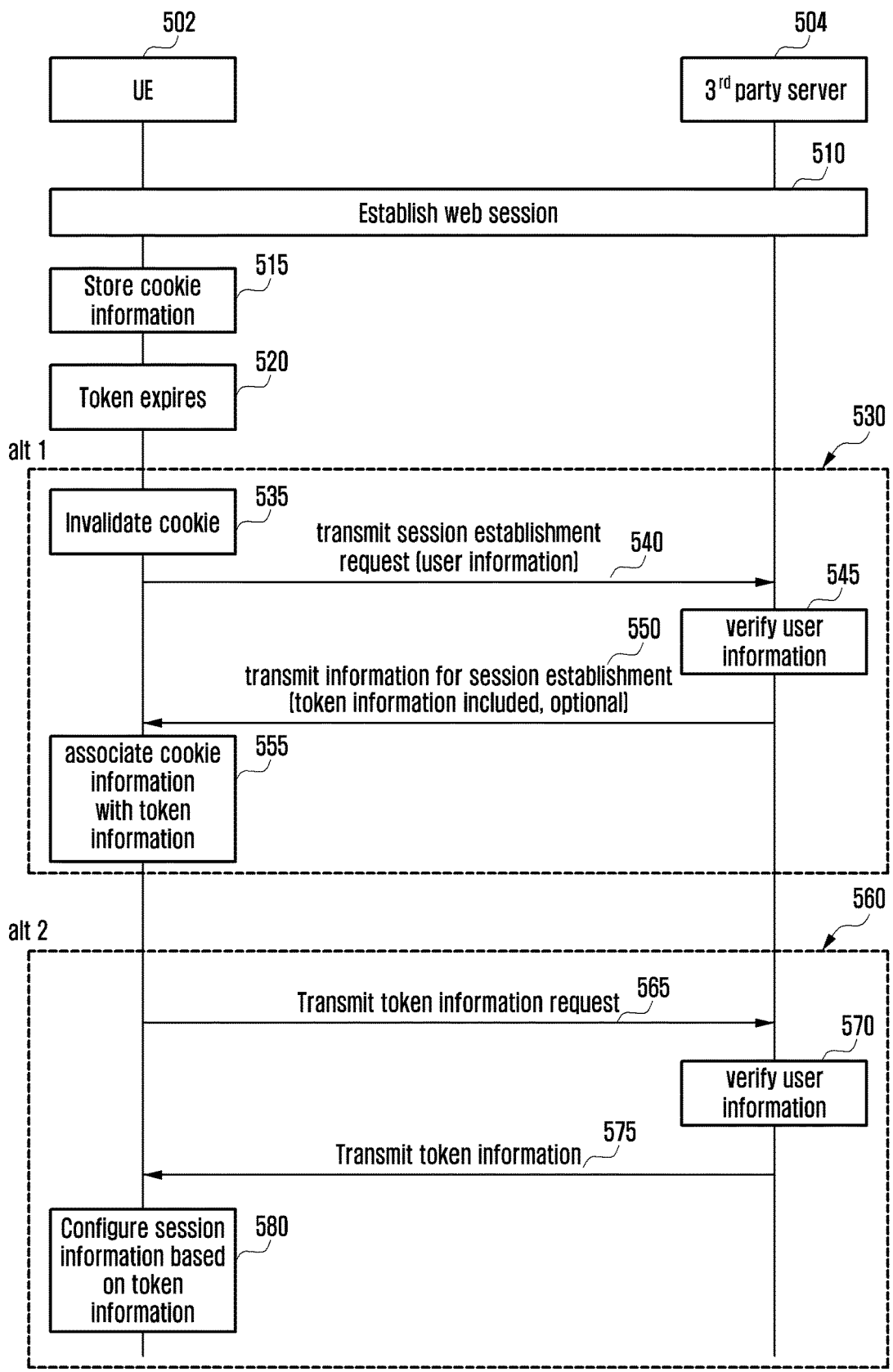
FIG. 5 illustrates a scheme for exchanging information between the server and the user equipment when token information has expired according to an embodiment of the present specification.

FIG. 5 illustrates a scheme for exchanging information between the server and the UE when token information has expired according to an embodiment of the present specification.

Referring to FIG. 5, the UE 502 and the third party server 504 may exchange signals. A network entity may be disposed between the two entities according to embodiments.

At step 510, the UE 502 and the third party server 504 may establish a web session to send and receive service-related data. The UE 502 may receive token information needed for the service from the third party server 504. Thereby, the UE 502 may receive the service from the third party server 504.

At step 515, the UE 502 may store received cookie information. As described before, the cookie information may be stored in combination with the token information.

At step 520, the token may expire. The token may expire when the time duration set in the token expires or when the amount of exchanged traffic exceeds the amount of allowed traffic set in the token. When the token expires after initiation of the token-based service, the token is no longer valid. Token invalidity may be determined according to the validity condition of the token (expiration of the valid time, exceeding the allowed amount of traffic, or the like). In addition, the validity of a cookie may be determined on the basis of the type of the cookie (e.g. session cookie and persistent cookie) and the valid time of the cookie ("Max age" in "Expires"). The cookie may be invalidated when the user terminates the corresponding application (e.g. web browser) for the web service or manually deletes the cookie.

Expiration of the token associated with the service before expiration of the web session may mean a situation where the service associated with the token (sponsored service or WebRTC service) is terminated owing to expiration of the token while the HTTP session between the third party server 504 and the UE 502 is still valid. In this case, a scheme is needed that can minimize user inconvenience due to token expiration (repeated login) and reduce the processing load of the web server (session reestablishment with UE).

To deal with token expiration, operations of the UE 502 and the third party server 504 may be carried out according to at least one of two alternatives indicated by indicia 530 and 560.

The first alternative indicated by indicia 530 may involve setting cookie-related information. This alternative may be executed by a token management module (software module handling a sponsored service or WebRTC service, and referred to as a service daemon) of the UE 502 under the control of the controller of the UE 502.

At step 535, the service daemon may determine whether the token associated with the web session has expired while the web session is still valid (i.e. the cookie has not expired yet), and may delete or invalidate the cookie if the token has expired. Here, the service daemon may determine that the cookie has expired when the token associated with the cookie has expired regardless of actual cookie expiration. Upon determining that the cookie has expired, the web session between the UE 502 and the third party server 504 may be broken.

At step 540, the UE 502 may perform an operation for session reestablishment (repeated login if necessary) by sending a request message for session establishment to the third party server 504. The request message for session establishment may include information regarding at least one of the user and the service.

At step 545, the third party server 504 may verify the received user information. The third party server 504 may generate information for establishing a new session and reissue a token for the UE 502 if possible according to the user information. Here, the token may be reissued by the third party server 504 or reissued by a separate token generation server in response to a request from the third party server 504.

At step 550, the third party server 504 may send the information for session establishment to the UE 502. Token information may be selectively included in the information for session establishment.

At step 555, the UE 502 may configure cookie information on the basis of the received information. Here, in the UE 502, the cookie for the web session may be associated with the newly generated token information.

The second alternative indicated by indicia 560 may involve updating the token only while maintaining the web session being still valid.

At step 565, the service daemon of the UE 502 may continuously monitor the validity of the web session and the validity of the token. If the token expires while the web session is still valid, the service daemon may send a token information request message for token reissuance to the third party server 504 while maintaining the web session as it is. Here, the token information request message may be sent using the HTTP protocol and may include the GET method and a target indicating a new token request for the same service. The token information request may include user information. To maintain the web session, the UE 502 may include information indicating the session to be maintained (i.e. session information (SSID) set in the cookie) in a session request message.

At step 570, the third party server 504 may verify the user information and perform an operation for token reissuance according to the verified user information.

At step 575, the third party server 504 may send a message containing the reissued token information to the UE 502.

At step 580, the UE 502 may configure session information on the basis of the received token information. Specifically, upon reissuance of the token, the UE 502 may configure web session information (i.e. cookie information) so that the original web session and the token-based service are combined or associated together. This can be achieved by setting the ID of the new token to that of the old token and leaving the cookie as it is, or by generating a new ID of the new token and changing the web session information accordingly (i.e. change the token ID for cookie settings).

Meanwhile, unlike the situation described above, the UE and the third party server may have to cope with a situation where the web session expires while the token for a web service is still valid (e.g. forced termination of the web session when there is no user activity for a given time).

Figure 6:
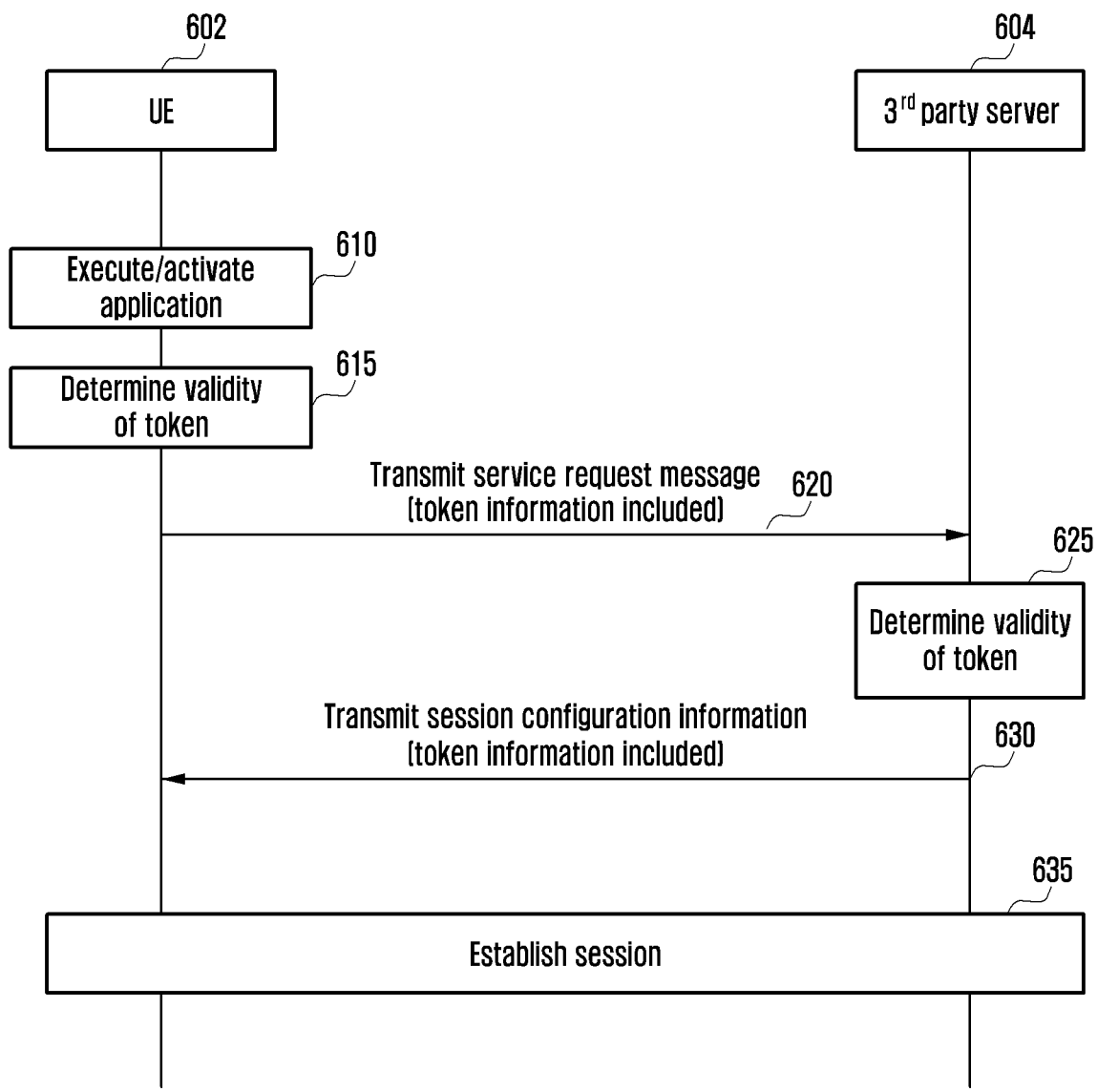
FIG. 6 illustrates a scheme for exchanging information between the server and the user equipment when token information is valid upon session establishment according to an embodiment of the present specification.

FIG. 6 illustrates a scheme for exchanging information between the server and the user equipment when token information is valid upon session establishment according to an embodiment of the present specification.

Referring to FIG. 6, the UE 602 and the third party server 604 may exchange signals. A network entity may be disposed between the two entities according to embodiments.

At step 610, the service daemon of the UE 602 may determine whether an application associated with a specific web service is executed or activated. Specifically, the service daemon of the UE 602 may determine whether an application associated with a specific web service (web browser, sponsored service application, or WebRTC application) is newly executed or changes its state from idle (background) to active (foreground).

Upon determining that an application is executed or activated, at step 615, the service daemon may determine whether the stored token is valid. Specifically, the service daemon may determine that the token associated with the application being executed or activated is valid when the expiration time of the token is not reached yet or when the amount of consumed traffic does not exceed the maximum allowed amount of traffic.

Upon determining that the token is still valid, at step 620, for new session establishment, the UE 602 may send the third party server 604 a service request message containing identification information (login request message or service request message after login) of the stored token. Here, the service request message may be sent using the HTTP protocol and may include the CONNECT method or GET method.

At step 625, the third party server 604 may determine whether the token for the target user is valid on the basis of the identifier of the token received from the UE 602.

Upon determining that the token is still valid, at step 630, the third party server 604 may determine not to issue a new token and send web session configuration information based on the existing token to the UE 602. Specifically, the third party server 604 may send web session information containing the existing token ID to the UE 602.

At step 635, the UE 602 and the third party server 604 may establish a session. Here, the UE 602 may configure the cookie related with the service so that the cookie is associated with the existing token ID.

Upon determining that the existing token is not valid, as a new token is needed, the third party server 604 may issue a new token and configure web session information on the basis of the new token.

Meanwhile, in another embodiment, it is possible to create and use two or more web sessions for one web service. In this case, the permission information or validity information (i.e. token) for the single web service may be used in association with the multiple web sessions. More specifically, the third party server may include the same web service (token) identifier in one or more pieces of the web session information configured in the UE during the process of session establishment for the web service. Consequently, one or more cookies created in the UE may contain the same token identifier and the service can be offered accordingly. Hence, it is possible to count the traffic used by the service corresponding to each token identifier when the service is offered.

In addition, when the duration of the sponsored service is long (e.g. one month), or when the sponsored service is applied on a traffic volume basis, the UE may leave from or detach from the network (power-off) before the sponsored service quota assigned to the token for the UE is used in full. In this case, a scheme is needed that, when the UE reattaches to the network, enables the UE to resume reception of the sponsored service. Additionally, for resuming reception of the sponsored service, it is necessary to reduce unnecessary signaling of the core network or the associated server, decreasing loads on the operator network and the third party server.

Figure 7:
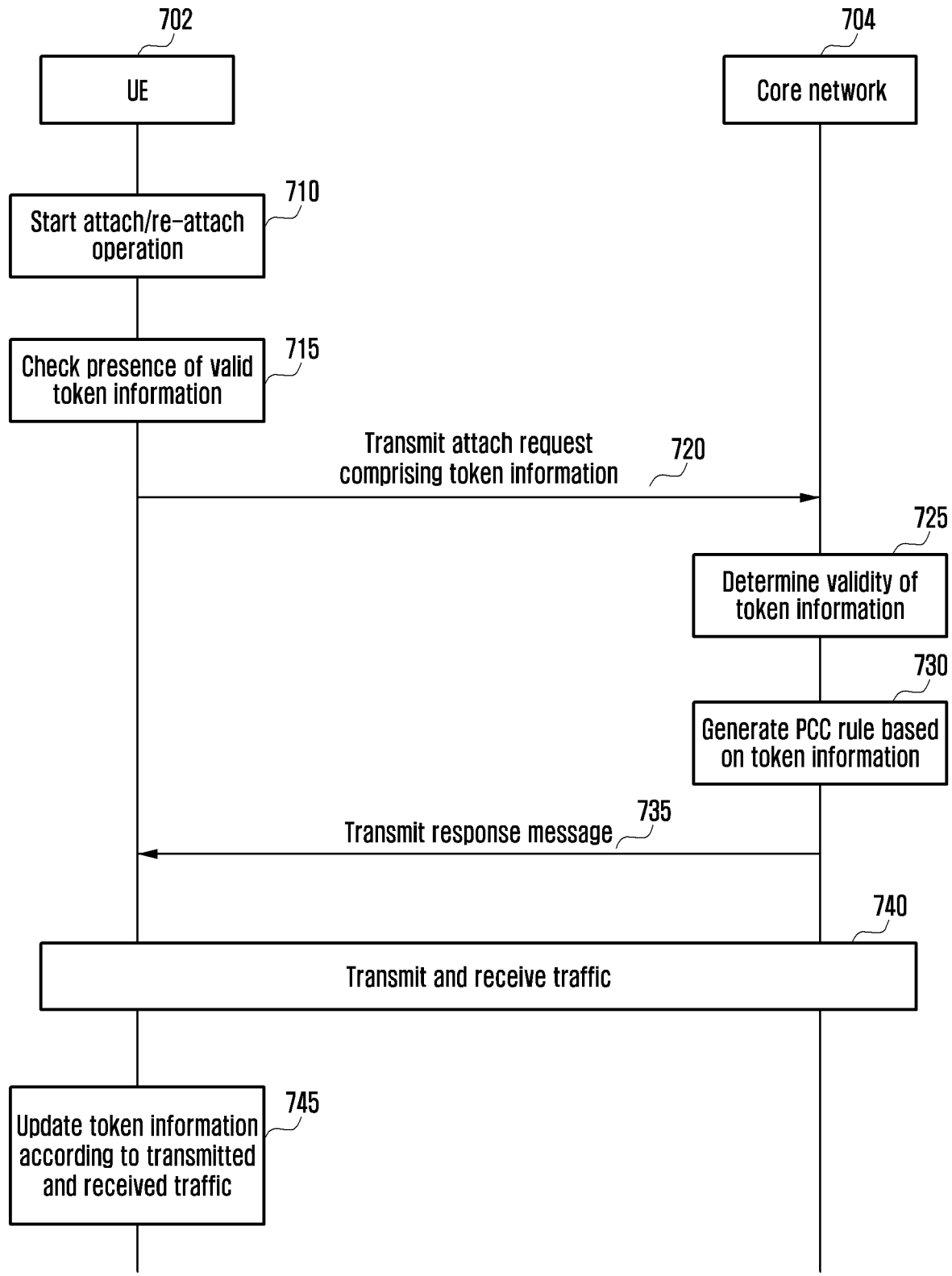
FIG. 7 illustrates a scheme for a user equipment having token information to connect to a core network node according to an embodiment of the present specification.

FIG. 7 illustrates a scheme for a user equipment having token information to connect to a core network node according to an embodiment of the present specification.

Referring to FIG. 7, the UE 702 may send and receive signals to and from the core network 704. The core network 704 may be at least one node among the PGW, PCRF and TDF according to embodiments.

At step 710, the UE 702 may perform an attach or re-attach related operation. This operation may be performed after the UE 702 detached from the operator network in the course of receiving a service based on valid token information.

At step 715, the UE 702 may determine whether valid token information is stored.

Upon determining that valid token information is stored, at step 720, the UE 702 may send an attach request containing the token information to the core network 704. Here, the token information may include information regarding at least one of the token identifier, the target address of the associated service, the validity time, the maximum amount of allowed traffic, and QoS of the service.

At step 725, the core network 704 may determine whether the received token information is valid. Validity examination may be performed on the basis of not only the information sent by the UE 702 but also the token information stored in the core network or a separate server.

Upon determining that the token information is valid, at step 730, the core network 704 may generate a Policy and Charging Control (PCC) rule on the basis of the received token information and use the PCC rule later to control traffic for the corresponding service.

At step 735, the core network 704 may send a response message to the UE 702.

At step 740, the UE 702 and the core network 704 may send and receive traffic for the service. Here, the core network 704 may carry out charging operations on the basis of the PCC rule set in advance. The core network 704 may perform traffic control according to zero-rating or the QoS level associated with the service.

If valid token information is not stored at step 715, the UE 702 may perform a regular attach operation. In this case, the core network may send a token generation request to the server providing the sponsored service or WebRTC service.

At step 745, the UE 702 may send and receive traffic related to the service and update the token information accordingly. For example, when the token is applied on a volume basis, the UE 702 may update the amount of used traffic according to the sent and received traffic.

Figure 8:
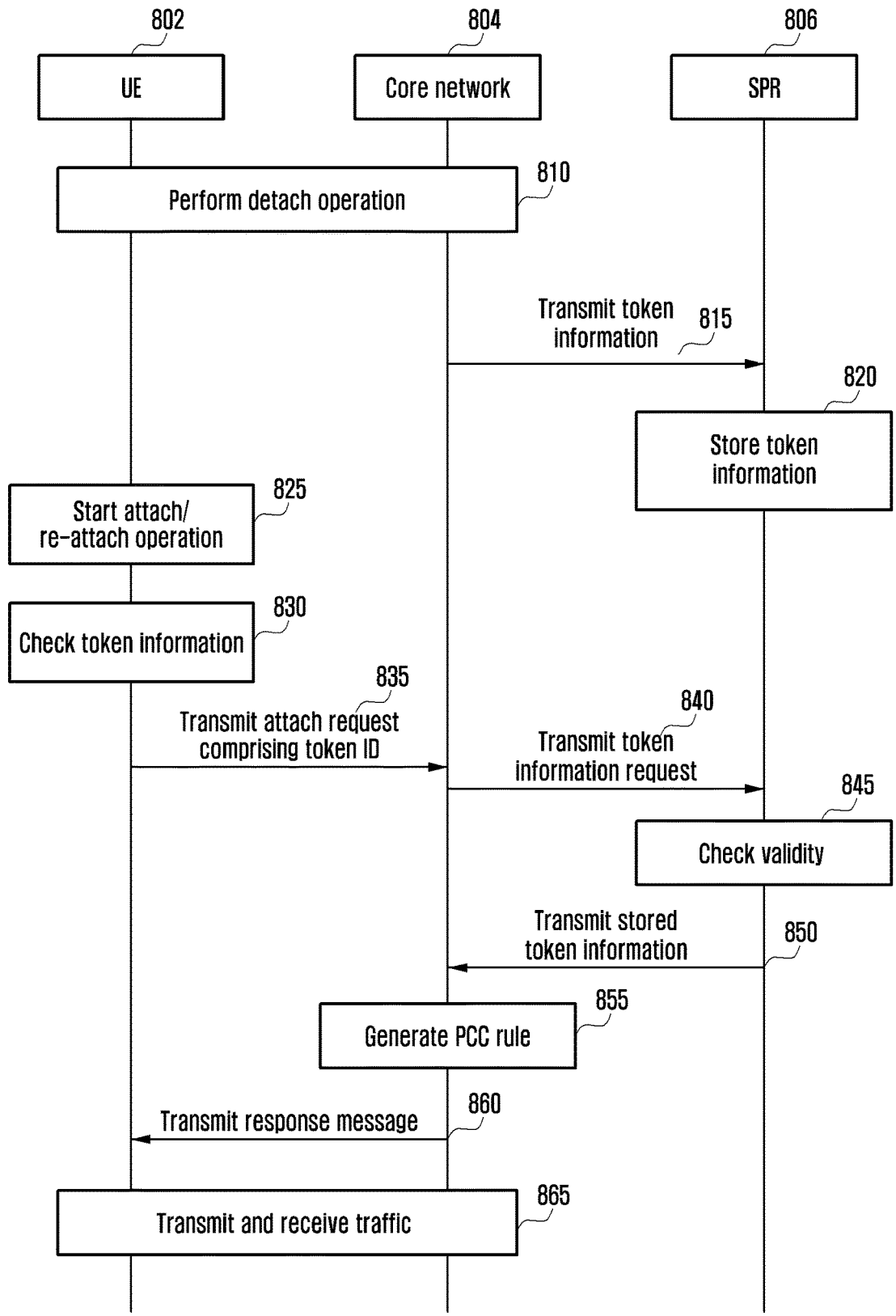
FIG. 8 illustrates a scheme for exchanging token information between the user equipment and a core network node to provide a corresponding service according to an embodiment of the present specification.

In the above scheme where the UE 702 sends token information to the core network 704, it is not necessary for the operator network to store the token. However, the operator network may experience loads caused by token delivery and processing at each attach operation. FIG. 8 illustrates a scheme for exchanging token information between the user equipment and the core network node to provide a corresponding service according to an embodiment of the present specification.

Referring to FIG. 8, the UE 802 may send and receive signals to and from the core network 804. The core network 804 may be at least one node among the PGW, PCRF and TDF according to embodiments. The core network 804 may send and receive signals to and from Subscriber Profile Repository (SPR) 806. In one embodiment, the SPR 806 may be configured as a separate server or be included in a node of the core network 804.

In one embodiment, when a new token is received from the UE 802, the core network 804 may determine the validity of the received token, store the token information in a network database (e.g. SPR), and maintain the stored token information even after detachment of the UE 802. The token information may include information regarding at least one of the token identifier, the target address of the associated service, the validity time, the maximum amount of allowed traffic, and QoS of the service. Here, the token information is sent to the SPR 806 at a point in time between token reception and detachment of the UE 802. At step 810, the UE 802 may detach from the core network 804.

At step 815, the core network 804 may send the token information to the SPR 806. For example, information on the aggregate amount of traffic immediately before UE detachment may be sent to the SPR 806.

At step 820, the SPR 806 may store the token information.

At step 825, the UE 802 may perform an attach or reattach related operation.

At step 830, the UE 802 may determine whether valid token information is stored.

Upon determining that valid token information is stored, at step 835, the UE 802 may send an attach request containing the token information to the core network 804. Specifically, the UE 802 may send an attach request containing a token identifier to the core network 804.

At step 840, the core network 804 may send a token information request to the SPR 806 on the basis of the received token identifier.

At step 845, the SPR 806 may determine validity of the token on the basis of the token identifier.

At step 850, the SPR 806 may send the stored token information to the core network 804. The token information being sent may include information regarding at least one of the token identifier, the target address of the associated service, the validity time, the maximum amount of allowed traffic, and QoS of the service.

At step 855, the core network 804 may generate a PCC rule on the basis of the received token information.

At step 860, the core network 804 may send a response message to the UE 802.

At step 865, the UE 802 may send and receive traffic to and from the core network 804.

Figure 9:
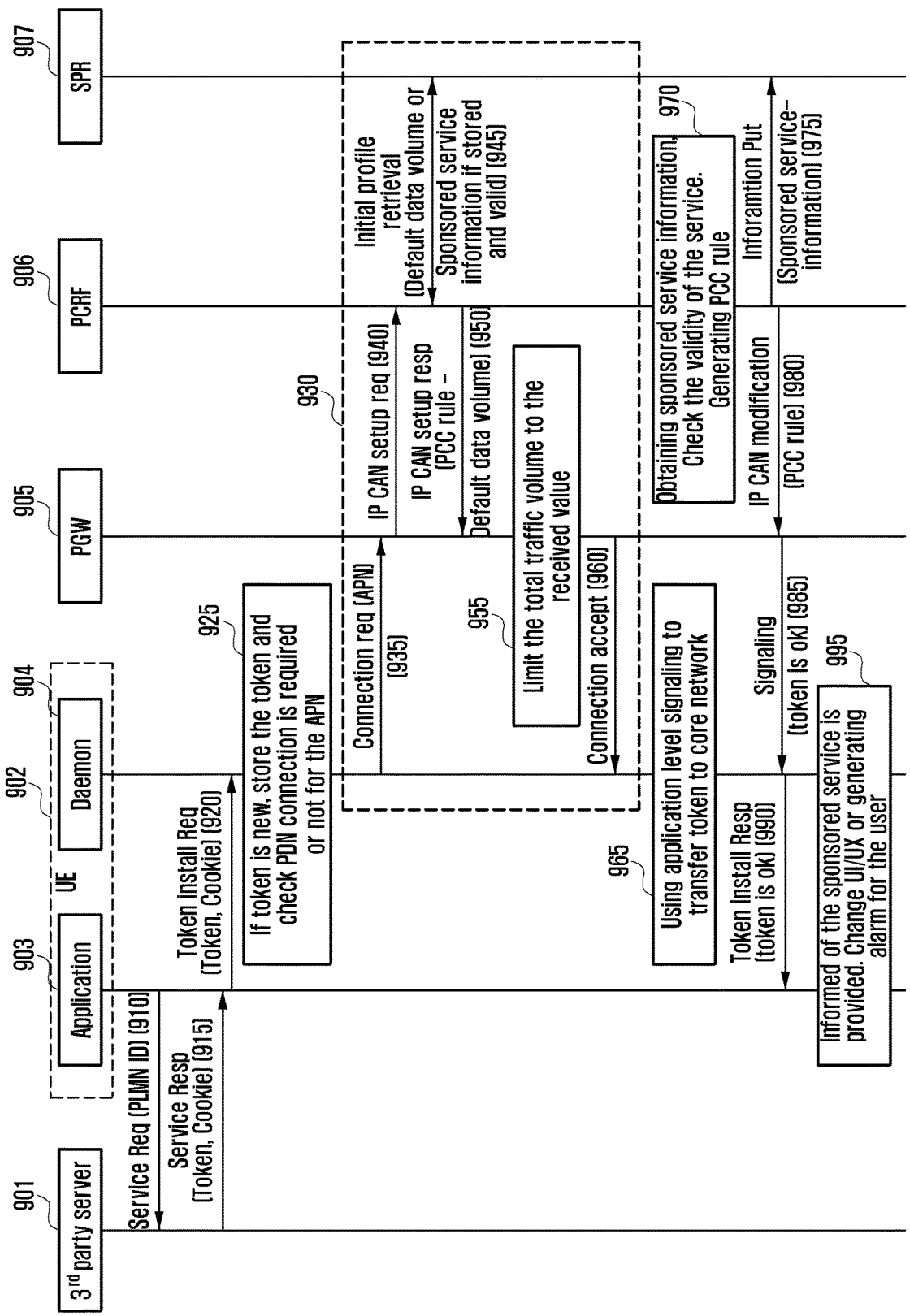
FIG. 9 illustrates a scheme for exchanging token information between the user equipment and a core network node to provide a corresponding service according to another embodiment of the present specification.

FIG. 9 illustrates a scheme for exchanging token information between the user equipment and a core network node to provide a corresponding service according to another embodiment of the present specification.

Referring to FIG. 9, at least one among the third party server 901, the UE 902, the PGW 905, the PCRF 906, and the SPR 907 may send and receive signals to and from a different entity. The UE 902 may include an application layer 903 and a service daemon layer 904.

At step 910, the application layer 903 may send a service request message for requesting token information and cookie information to the third party server 901. Here, the service request message may include identification information of the UE 902, and the identification information may include Public Land Mobile Network (PLMN) ID of the network operator to which the UE 902 has subscribed. The service request message may also include the identifier of the UE 902.

At step 915, the third party server 901 may send token information and cookie information for service provisioning to the application layer 903 on the basis of the received information. Although token information is also sent to the application layer 903, it may be sent at a separate step. In one embodiment, when token information is stored in the UE 902, it may be included in the service request message. In this case, the third party server 901 may send a response message containing cookie information to the application layer 903.

At step 920, the application layer 903 may send a request message for configuring the token information and cookie information to the service daemon layer 904. Here, the token information may include Access Point Name (APN) information to which the UE 902 may have access.

At step 925, the service daemon layer 904 may determine whether the received token information is new and store the token information if it is new. The service daemon layer 904 may also determine whether a PDN connection is required for the APN associated with the token information. The service daemon layer 904 may store the token information and the cookie information in an associated manner and may perform session management according to the embodiments described before.

If a PDN connection is required, operations indicated by indicia 930 can be carried out.

At step 935, the service daemon layer 904 may send a connection request message containing the APN information to the PGW 905.

At step 940, the PGW 905 may send an IP-CAN setup request message to the PCRF 906 on the basis of the received message.

At step 945, the PCRF 906 may obtain initial profile information of the UE 902 through signal exchange with the SPR 907 on the basis of the received information. The initial profile information may include information on the default data volume of the sponsored service or on the sponsored service. If such information is stored in the SPR 907 and is valid, the PCRF 906 may obtain the desired information through this step.

At step 950, the PCRF 906 may send an IP-CAN setup response message to the PGW 905 on the basis of at least one piece of information obtained at the previous step. The IP-CAN setup response message may include information regarding the PCC rule and the default data volume.

At step 955, the PGW 905 may control the traffic sent and received for the service and apply a related policy on the basis of the received information.

At step 960, the PGW 905 may send a response message to the service daemon layer 904.

At step 965, the service daemon layer 904 may send the token information to the core network through application level signaling.

At step 970, the PCRF 906 may determine whether the service is valid on the basis of the obtained token information and set a PCC rule according to the determination result.

At step 975, the PCRF 906 may store or transfer information for updating sponsored service information to the SPR 907. The SPR 907 may update the sponsored service information for the UE 902 on the basis of the received information.

At step 980, the PCRF 906 may send the PGW 905 an IP-CAN modification message carrying information related to the PCC rule. The PGW 905 may deliver the service on the basis of the received PCC rule.

At step 985, if the token from the UE 902 is valid, the PGW 905 may send the service daemon layer 904 a response message indicating that the token is valid.

At step 990, the service daemon layer 904 may notify the application layer 903 of token validity on the basis of the received information.

At step 995, the UE 902 may notify the user that the sponsored service will be provided normally on the basis of the received token information. Thereafter, the user may obtain UI/UX-based information regarding the sponsored service provided through traffic being sent and received.

Figure 10:
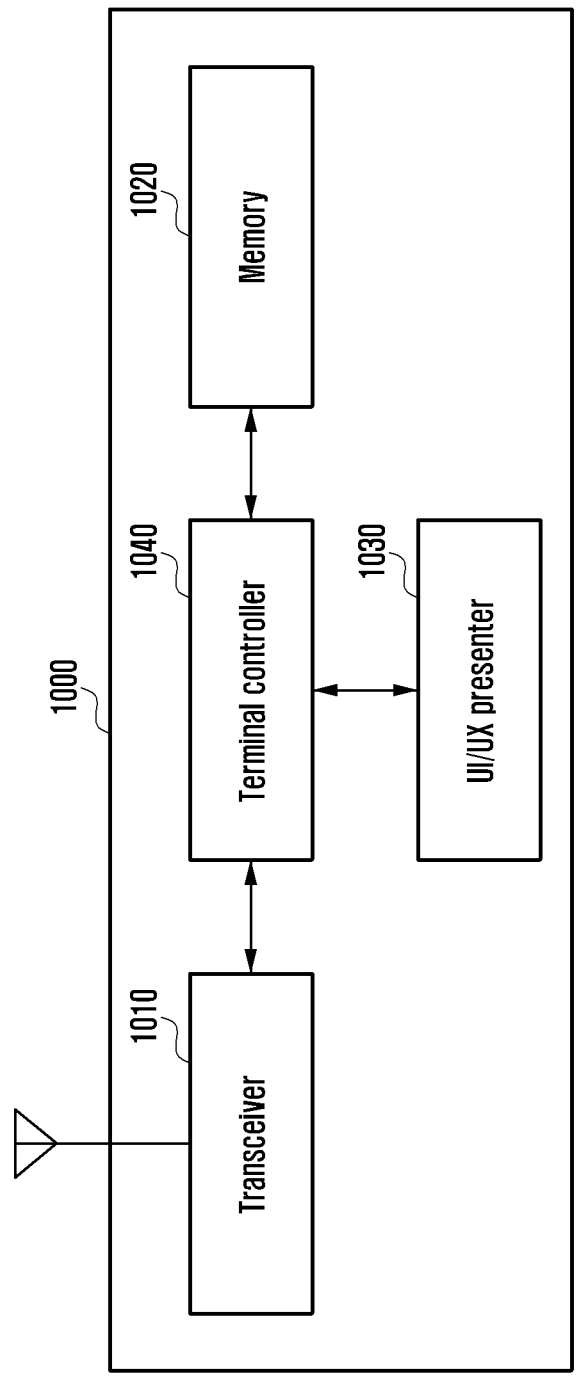
FIG. 10 is a block diagram of a user equipment according to an embodiment of the present specification.

FIG. 10 is a block diagram of a user equipment according to an embodiment of the present specification.

Referring to FIG. 10, according to an embodiment of the present specification, the UE 1000 may include at least one of a transceiver unit 1010, a storage unit 1020, a UI/UX presenter 1030, and a terminal controller 1040.

The transceiver unit 1010 may send and receive signals to and from the operator network or the third party server. Specifically, the transceiver unit 1010 may send and receive signals to and from a base station of the operator network to exchange information with the core network or server.

The storage unit 1020 may store at least one of information needed for operations of the UE 1000 and information sent and received through the transceiver unit 1010. More specifically, the storage unit 1020 may store token information and cookie information in association with a sponsored service or WebRTC service.

The UI/UX presenter 1030 may provide information associated with operation of the UE 1000 to the user, and may include a display section to present visual information and a sound output section to output auditory information.

The terminal controller 1040 may control the overall operation of the UE 1000, and may also control operations of multiple layers inside the UE 1000. The terminal controller 1040 may control the UE 1000 to perform operations according to the embodiments described before.

Figure 11:
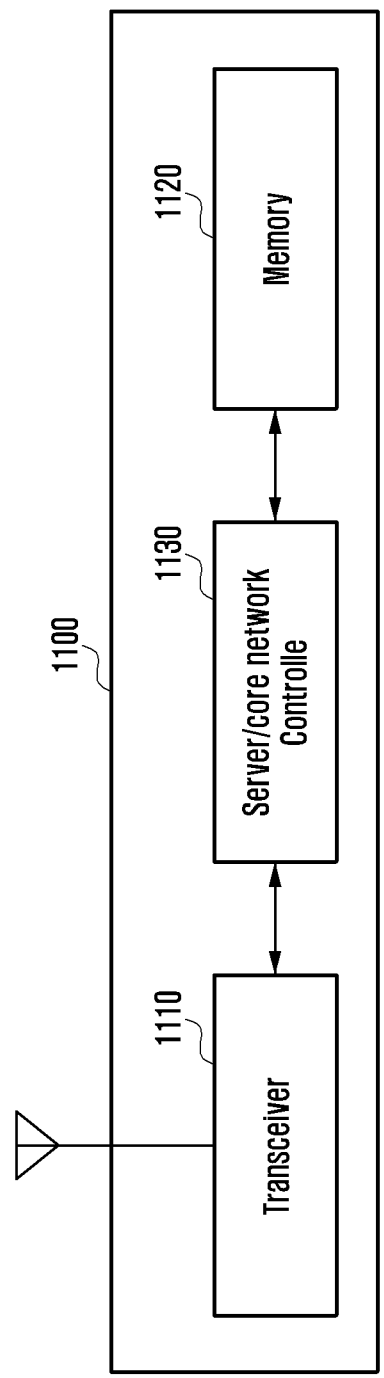
FIG. 11 is a block diagram of a server or core network node according to an embodiment of the present specification.

FIG. 11 is a block diagram of a server or core network node according to an embodiment of the present specification.

Referring to FIG. 11, the server or core network node 1100 may include at least one of a transceiver unit 1110, a storage unit 1120, and a server/core network controller 1130.

The transceiver unit 1110 may send and receive signals to and from a UE or another node.

The storage unit 1120 may store at least one of information needed for operations of the server/core network node 1100 and information sent and received through the transceiver unit 1110.

The server/core network controller 1130 may control the overall operation of the server/core network node 1100. The server/core network controller 1130 may control the server/core network node 1100 to perform operations according to the embodiments described before.

In the embodiments described above, all steps may be selectively performed or skipped. Additionally, the steps in each embodiment may be not necessarily performed in the listed order and may be performed in a different order. The embodiments disclosed in the present specification and the drawings are not intended to limit the scope of the invention but are to serve only for illustrative purposes. It should be understood by the ordinary person skilled in the art that various changes or modifications of the embodiments are possible without departing from the spirit of the present invention.

In the above embodiments, the PGW or TDF is used as an intermediate node to transfer control information to a designated node of the core network. However, using the PGW or TDF as an intermediate node is for ease of description only, and the present specification is not limited thereto or thereby. Any other gateway node or router on the core network may be used as an intermediate node.

Hereinabove, exemplary embodiments of the present specification have been described with reference to the accompanying drawings. Specific terms or words used in the description should be construed in accordance with the spirit of the present invention without limiting the subject matter thereof. It should be understood that many variations and modifications of the basic inventive concept described herein will still fall within the spirit and scope of the present invention as defined in the appended claims and their equivalents.

The invention claimed is:

1. A method performed by a terminal in a wireless communication system, the method comprising:
   receiving, from a service providing server, first token information including a first token identifier for a first token issued to the terminal, wherein the service providing server providing a service is separate from a mobile network operator;
   receiving, from the service providing server, first session management information for managing a first session, the first session management information including information for generating a cookie in the terminal and information for identifying the service offered by the service providing server and corresponding to the first token information;
   generating the cookie associated with the first session in the terminal based on the first session management information, wherein the cookie includes information for identifying the first session, a value for determining a valid time of the first session, a domain name which is a destination of the first session, and the first token identifier;
   controlling the first session corresponding to the service based on the cookie; and
   identifying whether the first token has expired and whether the first session is valid,
   wherein in case that the first token has expired while the first session is valid, the method further comprises:
   maintaining the first session and the cookie;
   transmitting, to the service providing server, a second token information request message;
   receiving, from the service providing server, second token information including a second token identifier for a second token issued to the terminal, in response to the second token information request message; and
   updating the cookie associated with the first session based on the second token information and the first session management information by changing the token information in the cookie to the second token identifier so that the first session and the second token are associated, wherein the first session management information is maintained for the updating the first session,
   wherein the valid time of the first session is extended by updating the value for determining the valid time of the first session in the cookie based on a communication with the service providing server before an expiration of the valid time.

2. The method of claim 1, further comprising transmitting, to the service providing server, a message including information on the cookie when establishing a connection with the service providing server.

3. The method of claim 1, further comprising:
   transmitting, in case that the first session corresponding to the service has expired and the first token is valid, to the service providing server, a service request message comprising the first token information;
   receiving, from the service providing server, second session management information for managing a second session corresponding to the service;
   controlling the second session corresponding to the service based on the first token information and the second session management information; and
   transmitting, in case that the first token is valid, to a core network, a connection request message comprising the first token information.

4. The method of claim 1, wherein the second token information request message includes information indicating the first session to be maintained.

5. A method performed by a service providing server in a wireless communication system, the method comprising:
   transmitting, to a terminal, first token information including a first token identifier for a first token issued to the terminal;
   transmitting, to the terminal, first session management information for managing a first session, the first session management information including information for generating a cookie in the terminal and information for identifying a service offered by the service providing server and corresponding to the first token information; and
   controlling the first session corresponding to the service based on the cookie, wherein the cookie associated with the first session is generated by the terminal based on the first session management information and the cookie includes information for identifying the first session, a value for determining a valid time of the first session, a domain name which is a destination of the first session, and the first token identifier,
   wherein the service providing server providing a service is separate from a mobile network operator,
   wherein the valid time of the first session is extended by updating the value for determining the valid time of the first session in the cookie based on a communication with the service providing server before an expiration of the valid time, and
   wherein in case that the first token has expired while the first session is valid, the method further comprises:
   receiving a second token information request message from the terminal; and
   transmitting, to the terminal, second token information including a second token identifier for a second token issued to the terminal, in response to the second token information request message,
   wherein the cookie associated with the first session is updated based on the second token information and the first session management information by changing the token information in the cookie to the second token identifier so that the first session and the second token are associated, and wherein the first session management information is maintained for the updating the first session.

6. The method of claim 5, further comprising:
   receiving, in case that the first session corresponding to the service has expired and the first token is valid, from the terminal, a service request message comprising the first token information;
   transmitting, to the terminal, second session management information for managing a second session corresponding to the service; and controlling the second session corresponding to the service based on the first token information and the second session management information, wherein, in case that the first token is valid, a connection request message comprising the first token information is transmitted to a core network.

7. The method of claim 5, further comprising receiving, from the terminal, a message including information on the cookie when establishing a connection with the terminal.

8. A terminal in a wireless communication system, the terminal comprising:
a transceiver configured to transmit and receive a signal; and
a controller configured to:
receive, from a service providing server, first token information including a first token identifier for a first token issued to the terminal, wherein the service providing server providing a service is separate from a mobile network operator,
receive, from the service providing server, first session management information for managing a first session, the first session management information including information for generating a cookie in the terminal and information for identifying the service offered by the service providing server and corresponding to the first token information,
generate the cookie associated with the first session in the terminal based on the first session management information, wherein the cookie includes information for identifying the first session, a value for determining a valid time of the first session, a domain name which is a destination of the first session, and the first token identifier,
control the first session corresponding to the service based on the cookie, and
identify whether the first token has expired and whether the first session is valid,
wherein in case that the first token has expired while the first session is valid, the controller is further configured to:
maintain the first session and the cookie, in case that the first token has expired,
transmit, to the service providing server, a second token information request message,
receive, from the service providing server, second token information including a second token identifier for a second token issued to the terminal, in response to the second token information request message, and
update the cookie associated with the first session based on the second token information and the first session management information by changing the token information in the cookie to the second token identifier so that the first session and the second token are associated, wherein the first session management information is maintained for the updating the first session, and
wherein the valid time of the first session is extended by updating the value for determining the valid time of the first session in the cookie based on a communication with the service providing server before an expiration of the valid time.

9. The terminal of claim 8, wherein the controller is further configured to transmit, to the service providing server, a message including information on the cookie when establishing a connection with the service providing server.

10. The terminal of claim 8, wherein the controller is further configured to:
transmit, in case that the first session corresponding to the service has expired and the first token information is valid, to the service providing server, a service request message comprising the first token information;
receive, from the service providing server, second session management information for managing a second session corresponding to the service;
control the second session corresponding to the service based on the first token information and the second session management information; and
transmit, in case that the first token is valid, to a core network, a connection request message comprising the first token information.

11. A service providing server in a wireless communication system, the service providing server comprising:
a transceiver configured to transmit and receive a signal; and
a controller configured to:
transmit, to a terminal, first token information including a first token identifier for a first token issued to the terminal,
transmit, to the terminal, first session management information for managing a first session, the first session management information including information for generating a cookie in the terminal and information for identifying a service offered by the service providing server and corresponding to the first token information, and
control the first session corresponding to the service based on the cookie, wherein the cookie associated with the first session is generated by the terminal based on the first session management information and the cookie includes information for identifying the first session, a value for determining a valid time of the first session, a domain name which is a destination of the first session, and the first token identifier,
wherein the service providing server providing a service is separate from a mobile network operator,
wherein the valid time of the first session is extended by updating the value for determining the valid time of the first session in the cookie based on a communication with the service providing server before an expiration of the valid time, and
wherein in case that the first token has expired while the first session is valid, the controller is further configured to:
receive a second token information request message from the terminal, and
transmit, to the terminal, second token information including a second token identifier for a second token issued to the terminal, in response to the second token information request message,
wherein the cookie associated with the first session is updated based on the second token information and the first session management information by changing the token information in the cookie to the second token identifier so that the first session and the second token are associated, and wherein the first session management information is maintained for the updating the first session.

12. The service providing server of claim 11, wherein the controller is further configured to receive, from the terminal, a message including information on the cookie when establishing a connection with the terminal.

13. The service providing server of claim 11, wherein the controller is further configured to:
- receive, in case that the first session corresponding to the service has expired and the first token is valid, from the terminal, a service request message comprising the first token information,
- transmit, to the terminal, second session management information for managing a second session corresponding to the service, and
- control the second session corresponding to the service based on the first token information and the second session management information,
- wherein, in case that the first token is valid, a connection request message comprising the first token information is transmitted to a core network.

* * * * *